Nov. 18, 1924.

C. E. DAGEL 1,516,038

SNAPPING AND HUSKING ROLLERS

Filed May 7, 1924

Inventor

C. E. Dagel

By

Lacy & Lacy, Attorneys

Patented Nov. 18, 1924.

1,516,038

UNITED STATES PATENT OFFICE.

CHARLES E. DAGEL, OF SANBORN, IOWA.

SNAPPING AND HUSKING ROLLERS.

Application filed May 7, 1924. Serial No. 711,675.

*To all whom it may concern:*

Be it known that I, CHARLES E. DAGEL, a citizen of the United States, residing at Sanborn, in the county of O'Brien and State of Iowa, have invented certain new and useful Improvements in Snapping and Husking Rollers, of which the following is a specification.

This invention has for its object the provision of novel means whereby to effectually remove ears of corn from the stalks without breaking the stalks and also removing the husks from the ears. The rollers embodying my invention are designed more particularly for use in that type of machine in which a pair of rollers are mounted longitudinally on the frame and carried by the gathering arms so that, as the machine is driven along a row of standing stalks, the rollers will pass at opposite sides of the stalks and be rotated toward each other through mechanism driven by the ground wheels of the machine to snap from the stalks the ears of corn which will thereupon be delivered to a conveyer disposed at the inner side of the rollers and arranged to carry the ears of corn to husking mechanism. The rollers now generally employed in this type of machine are formed of metal and, owing to their inelasticity, frequently crush or break the corn stalk, so that the portion of the stalk above the rollers is delivered to the conveyer. In such instances, it happens frequently that the broken off portions of the stalk accumulate at some point in the length of the conveyer or at the point of delivery to the husking rolls and, consequently, choke the operation of the machine so that it is necessary to stop the machine and clear the obstruction, even if some parts of the working mechanism are not broken or otherwise damaged. It is, therefore, the object of my present invention to provide rollers which will be free of these objections and will yield to the thick stalks without releasing their engagement therewith so that, while the ears of corn will be effectually removed from the stalks, the stalks will not be broken but the stripped stalks will remain intact and will be cleared by the machine as its travel continues. The rollers embodying the invention also remove the husks from the ears so that the usual husking rollers are eliminated and the ears may be delivered at once to the wagon, thereby dispensing with mechanism now generally employed and reducing the draft of the machine. Rollers embodying my improvements are illustrated in the accompanying drawing and will be hereinafter fully described, the novel features being particularly pointed out in the appended claims.

Figure 1:
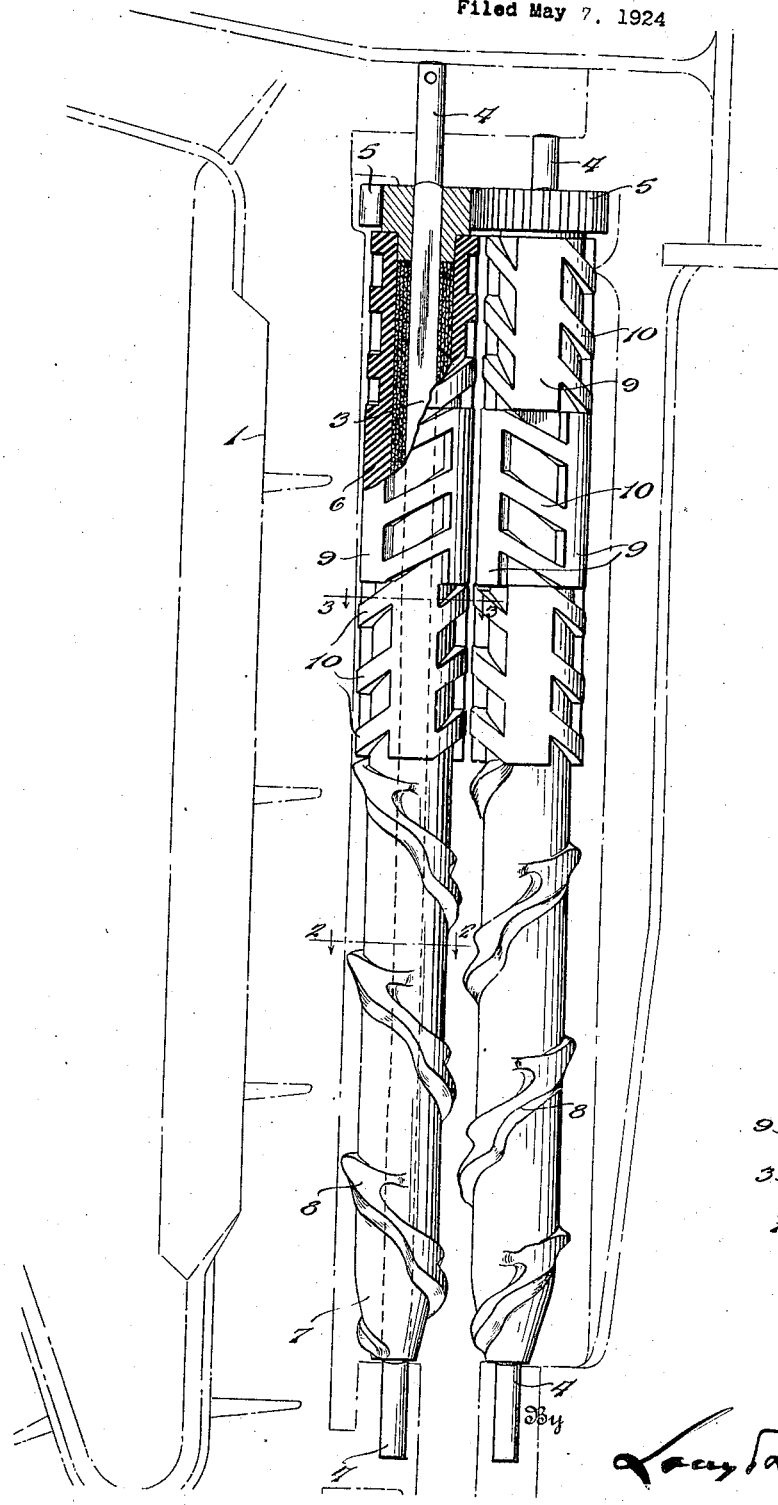
Figure 1 is a plan view of my improved rollers, a portion of the corn-gathering machine being indicated in light lines in order that the working position of the rolls may be readily comprehended.
Figure 2:
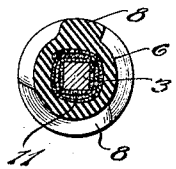
Fig. 2 is a transverse section through one of the rollers on the line 2—2 of Fig. 1.
Figure 3:
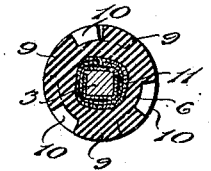
Fig. 3 is a section on the line 3—3 of Fig. 1.

In the drawing, the reference numeral 1 indicates a portion of the conveyer which usually receives the ears of corn from the rolls and carries them to the husking mechanism. In carrying out my present invention, I employ a shaft 3 which is flat-sided, as clearly shown in Fig. 2, and is provided with circular extremities, indicated at 4, to be rotatably engaged in bearings provided therefor in the gathering arms and the adjacent parts of the machine frame. The shafts are, of course, arranged in parallelism and longitudinally of the machine in the usual manner and adjacent their upper ends are equipped with intermeshing gears 5 whereby they are caused to rotate in opposite directions, and power is imparted to one of the shafts in the usual manner to cause the shafts to rotate toward each other. The working surface of each roll consists of a body 6 of rubber or similar material which is tapered at its front extremity, as shown at 7, so as to facilitate the passage of the stalks between the rolls, and upon these tapered extremities and the lower portions of the rollers are spiral ribs 8 which are adapted to engage against the stalks, as the machine is drawn along the row, and feed the stalks toward the rear ends of the rolls. The ribs 8 are disposed alternately upon the two rollers, that is, so that as the rollers rotate toward each other the rib on one roller will engage the corn stalks in cooperation with the space between coils of the rib on the other roller, the ears of corn being thereby snapped from the stalk and caused to travel along the rollers toward the upper rear ends thereof. Extending from the spiral ribs 8 to the rear ends of the respective rolls are annular series of longitudinal projections or short ribs 9 which are preferably rectangular in outline and are so disposed that the projections or ribs in the adjacent series of each roll are relatively staggered while the projections upon the two rolls are so arranged that in the rotation of the rolls corresponding opposed ribs will come together at opposite sides of a stalk. When two of the ribs 9 thus come together against the opposite sides of the stalk, they will obviously tend to compress the stalk so that if there should be an ear of corn immediately above or at the point of compression it will be squeezed from the stalk without injury thereto and will pass into the conveyer while the standing stalk will be evenly cleared at the rear end of the machine. As the ribs 9 come very close together in their operation, they will grip the husks and strip the latter from the ears, the husks passing down between the rollers and dropping to the ground while the ears roll onto the conveyer. It will be understood, of course, that the rollers are arranged in inclined positions longitudinally of the machine with their front ends lower than their rear ends.

The ribs or projections 8 and 9 are formed integral with the main bodies of the respective rollers but will be vulcanized to a greater degree than the bodies so that, while they will have sufficient yielding qualities to avoid breaking the corn stalks or bruising the corn, they will also have sufficient rigidity or stiffness to effectually snap the ears from the stalks or strip the husks from the ears. Extending obliquely between the longitudinal ribs 9 are the circumferential ribs 10 which deflect the ears to the side of the rollers, passage of the ears between the rollers with the consequent grinding of the ears being thereby avoided. The angular cross-sectional contour of the shaft 3 prevents its rotation within the rubber bodies of the rollers, and to provide a firm anchorage for the rubber one or more plies of canvas or similar fabric 11 are wrapped around the shaft, the rubber body being vulcanized onto the canvas.

My improved rolls may obviously be produced at a very low cost and may be mounted upon any machine now in use without any substantial change in the construction or arrangement of any of the parts of the same. Inasmuch as the stalks will not be broken by the use of my rolls, the delivery of portions of stalks to the conveyer, with consequent choking of the working mechanism, is obviously avoided and the crop may be gathered more expeditiously and at less cost than has been heretofore possible.

Having thus described the invention, I claim:

1. A roll comprising a rotatable shaft, and a substantially cylindrical body of elastic material secured upon the shaft and tapered at its front end, the said body being provided with a spiral rib around its forward portion and being further provided on its rear portion with annular series of longitudinally extending projections, the projections in adjacent series being relatively staggered.

2. A roll for the purposes set forth comprising a rotatable shaft, and a substantially cylindrical body of yieldable material surrounding the shaft, said body having upon its circumference annular series of longitudinal ribs and obliquely disposed ribs extending between the longitudinal ribs.

In testimony whereof I affix my signature.

CHARLES E. DAGEL. [L. S.]